United States Patent
Lee et al.

(10) Patent No.: US 11,323,245 B2
(45) Date of Patent: May 3, 2022

(54) METHOD FOR LINKING BLOCK-CHAIN USING HYPER-CHAIN, AND APPARATUS THEREFOR

(71) Applicant: Jeju National University Industry-Academic Cooperation Foundation, Jeju-si (KR)

(72) Inventors: Donghyeok Lee, Jeju-si (KR); Namje Park, Jeju-si (KR); In Kyung Kim, Jeju-si (KR)

(73) Assignee: JEJU NATIONAL UNIVERSITY INDUSTRY-ACADEMIC COOPERATION FOUNDATION, Jeju-si (KR)

( * ) Notice: Subject to any disclaimer, the term of this patent is extended or adjusted under 35 U.S.C. 154(b) by 252 days.

(21) Appl. No.: 16/690,283

(22) Filed: Nov. 21, 2019

(65) Prior Publication Data
US 2021/0044420 A1 Feb. 11, 2021

(30) Foreign Application Priority Data
Aug. 6, 2019 (KR) .......................... 10-2019-0095664

(51) Int. Cl.
*H04L 9/06* (2006.01)
*G06F 17/15* (2006.01)

(52) U.S. Cl.
CPC ............ *H04L 9/0637* (2013.01); *G06F 17/15* (2013.01); *H04L 9/0643* (2013.01); *H04L 2209/38* (2013.01)

(58) Field of Classification Search
CPC ............. G06F 16/1837; G06F 16/9024; G06F 21/602; G06F 16/90335
See application file for complete search history.

(56) References Cited

U.S. PATENT DOCUMENTS

| 2018/0114261 | A1* | 4/2018 | Jayachandran | .... G06Q 30/0623 |
| 2021/0157859 | A1* | 5/2021 | Bier | .................... G06F 16/1805 |

FOREIGN PATENT DOCUMENTS

| KR | 1020190059491 | 5/2019 |
| KR | 1019860810000 | 6/2019 |
| KR | 1020190075771 | 7/2019 |
| KR | 1020190085106 | 7/2019 |
| KR | 1020190088531 | 7/2019 |

* cited by examiner

*Primary Examiner* — Olugbenga O Idowu
(74) *Attorney, Agent, or Firm* — Lex IP Meister, PLLC

(57) ABSTRACT

Disclosed herein is a method for linking a blockchain using a hyper-chain and an apparatus therefor. According to the present invention, a correlation of a common block on at least two blockchains is identified by a predetermined method, and a hyper-block including an information of the correlated common block on the at least two blockchains is stored on a hyper-chain.

11 Claims, 6 Drawing Sheets

METHOD FOR LINKING BLOCK-CHAIN USING HYPER-CHAIN, AND APPARATUS THEREFOR

TECHNICAL FIELD

The present invention relates to a blockchain and, more particularly, to a method for linking a plurality of blockchains using a hyper-chain and an apparatus therefor.

BACKGROUND ART

Blockchain is formed by storing data on blocks and linking them in a chain type. Sine a great number of computers participating in blockchains store the blockchain at the same time, it is possible to prevent forgery or falsification of the data. However, it is difficult to correlation between data, which are stored on separated blockchains. For example, in case that manufacturing information of a manufacturer is stored on a first blockchain, and purchase information of a buyer is stored on a second blockchain, it is difficult to identify the relationship between the manufacturing information and the purchase information. Since necessary information should be searched on the first and second blockchain, respectively, it is very difficult to identify whether information related with the searched information on the first blockchain exists on any block of the second blockchain.

SUMMARY OF THE INVENTION

It is therefore an object of the present invention to provide a method for linking a plurality of blockchains using a hyper-chain and an apparatus therefor.

Embodiments of the present invention provide a method for linking a blockchain comprising identifying a correlation of a common block by a predetermined method on at least two blockchains, and storing a hyper-block including an information of the correlated common block on the at least two blockchains on a hyper-chain.

Embodiments of the present invention provide an apparatus for linking a blockchain comprising, a correlation-block identifying unit for identifying a correlation of a common block by a predetermined method on at least two blockchains, and a hyper-chain managing unit for storing a hyper-block including an information of at least two correlated common blocks.

Embodiments of the present invention provide a storage medium comprising a block header of at least two correlated common blocks and a block header of a previous hyper-block, a block list including a list of at least two correlated common blocks, and a block data including a data representing an attribute or a relation of the at least two correlated common blocks.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Hereinafter, the present invention will be described in detail with reference to the drawings. In describing the present invention, detailed descriptions related to publicly known functions or configurations will be omitted in order not to obscure the gist of the present invention.

The present invention may, however, be embodied in different forms and should not be construed as limited to the embodiments set forth herein.

Various modifications to the preferred embodiments will be readily apparent to those skilled in the art and the generic principles herein may be applied to other embodiments. Thus, the present invention is not limited to the embodiment shown but is to be accorded the widest scope consistent with the principles and features described herein.

The present invention may, however, be embodied in different forms and should not be construed as limited to the embodiments set forth herein. The same reference numeral is used to refer to like elements throughout.

In the specification, terms such as "include" or "have" should be understood as designating that features, number, steps, operations, elements, parts, or combinations thereof exist and not as precluding the existence of or the possibility of adding one or more other features, numbers, steps, operations, elements, parts, or combinations thereof in advance.

Hereinafter, the technical construction of the present invention will be described in detail with reference to preferred embodiments illustrated in the attached drawings.

Figure 1:
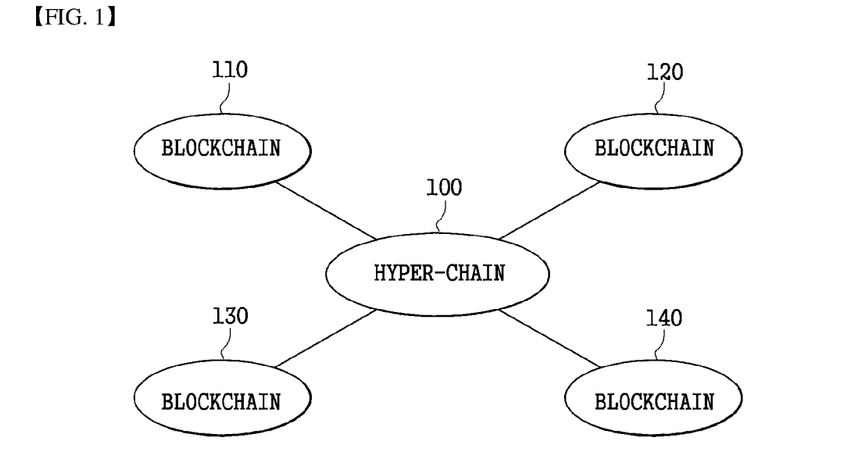
FIG. 1 shows a concept of a hyper-chain according to an embodiment of the present invention.

FIG. 1 shows a concept of a hyper-chain according to an embodiment of the present invention.

Figure 4:
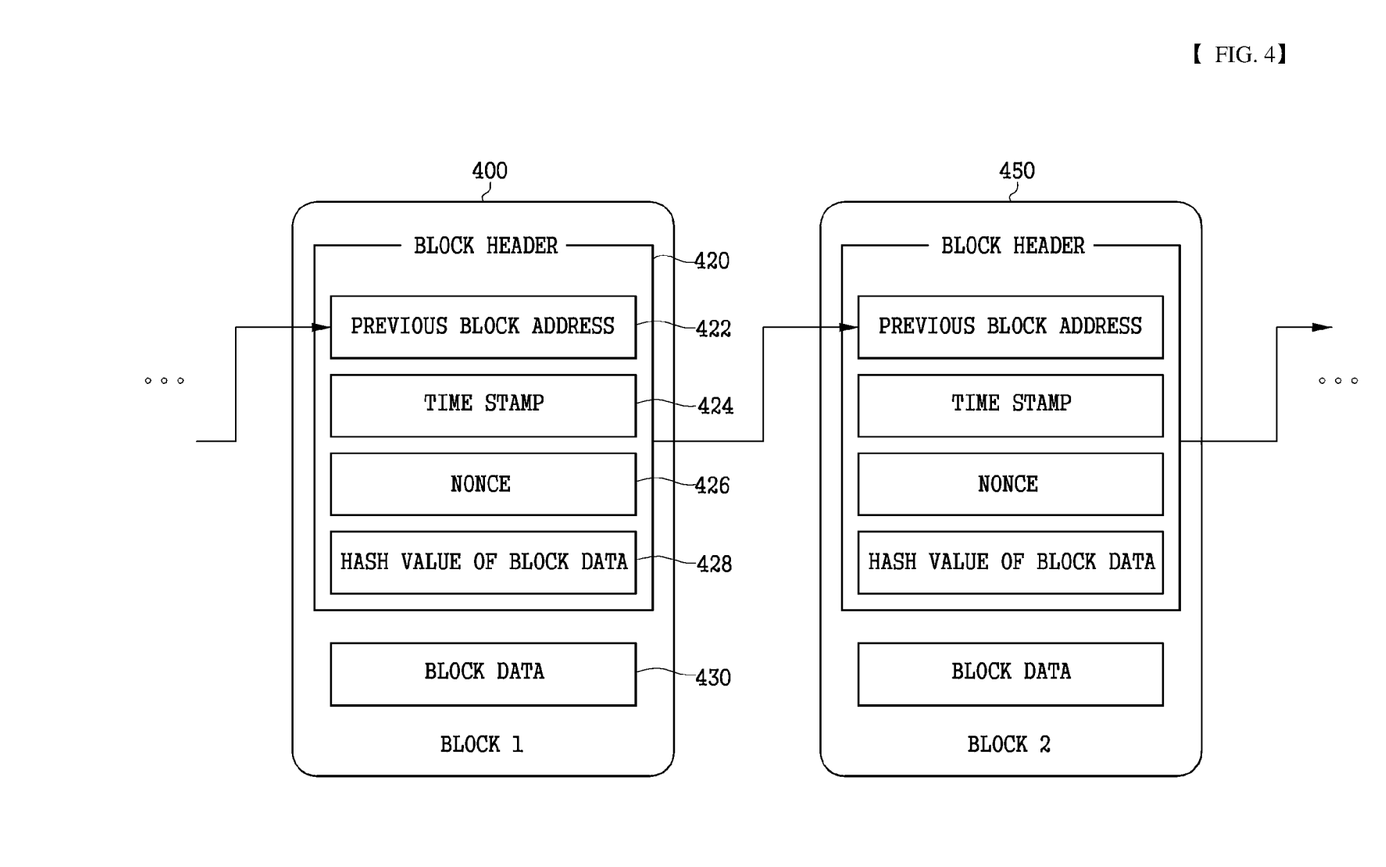
FIG. 4 shows an example of a blockchain according to an embodiment of the present invention.
Figure 5:
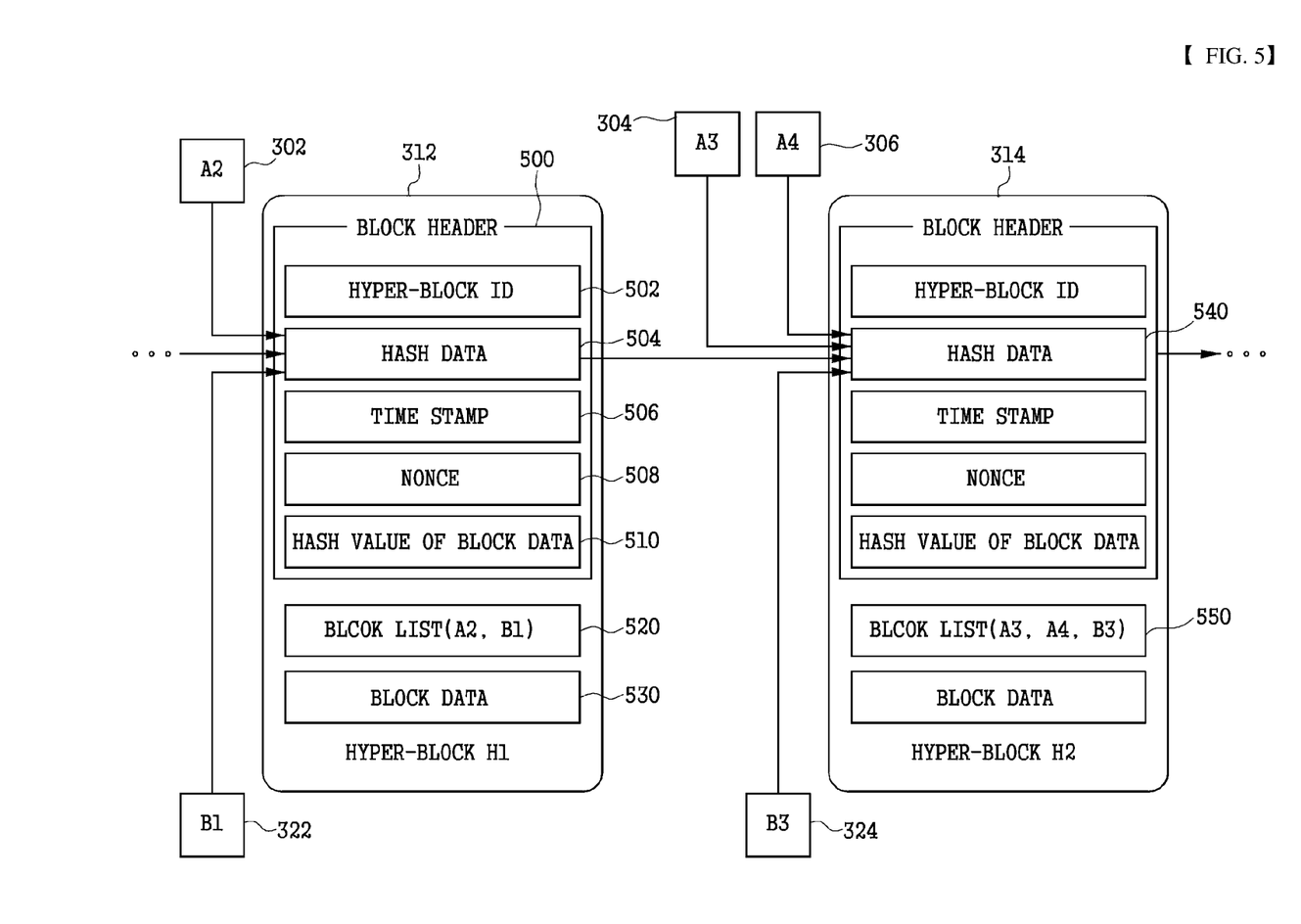
FIG. 5 shows an example of a hyper-chain according to an embodiment of the present invention.

Referring to FIG. 1, at least one block chain 110, 120, 130, and 140 for storing various information and a hyper-chain 100 for storing a correlation of each of blocks on the block chain 110, 120, 130, and 140 are included. The hyper-chain 100 is formed by partly modifying the blockchain, and called hyper-chain for distinguishing a common blockchain. Hereinafter, for convenience of explanation and distinguishing the block of the hyper-chain 100 from the block of the at least one block chain 110, 120, 130, and 140, the block of the hyper-chain is referred to as "hyper-block", and the block of the blockchain is referred to as "common block". An example of the common block is shown in FIG. 4, and an example of the hyper-block is shown in FIG. 5.

A kind of data stored on each of the block chains 110, 120, 130, and 140 is various according to embodiments. For instance, various kinds of data such as a manufacturing information, a purchase information, CCTV images, and so on stored and managed in a database may be stored on each of the block chains 110, 120, 130, and 140. As another example, big data or various learning data of AI model (e.g., Convolution Neural Network, hereinafter referred to as "CNN") may be stored on each of the block chains 110, 120, 130, and 140.

Data representing correlation between the common blocks of each of the block chains 110, 120, 130, and 140 on the hyper-chain 100. For example, in case that a product manufacturing information is stored on a first blockchain 110, and a product purchase information is stored on a second 120, the common block in which the same the product information is stored on the first and second blockchains 110 and 120 is identified, and then a relation information with respect to the identified common block is stored on the hyper-block of the hyper-chain. Accordingly, the manufacturing and purchase information of a product can be identified using the hyper-chain 100 at once.

In another embodiment of the present invention, a CCTV image is stored on the first blockchain 110, and various sensing information (e.g., where users have been and what users have been doing at a specific time) such as a payment information or a transportation payment information of users may be stored. After checking a mapping relation of the CCTV image on a corresponding location at the time of identifying sensing information of users, a corresponding a relation information of the common block of the first and second blockchains 110 and 120. For instance, based on time and space information, the common block related between the blockchains 110 and 120 can be identified. As another example, if users can be distinguished through a face recognition on a CCTV image, a sensing information such as payment information of users consisting with an identification information identified on the CCTV image is identified to be capable of identifying a related common block. As another example, if there is a need to track criminals or missing persons, it is possible to easily identify a related CCTV image and a sensing information through the hyper-chain 100.

In still another embodiment of the present invention, data at each stage of an AI learning such as CNN may be stored on the plurality of the block chains 110, 120, 130, and 140. For instance, if an image reducing process (that is, pooling or sub-sampling) in order to extract a feature in CNN for extracting image features, an original image is stored on the first blockchain 110, and a reducing image is stored on the second blockchain 120. If the image reducing process is repeated, the reducing images may be sequentially stored on third and fourth blockchains 130 and 140, respectively. The correlation between the original image and reducing image stored on the each of the block chains 110, 120, 130, and 140 may be stored on the hyper-chain 100.

The hyper-chain 100 is capable of variously configuring a creation point of the hyper-block according to a kind of a stored relation information. For instance, the hyper-chain 100 creates a hyper-block by a predetermined time or identifies the correlation between the common blocks to generate a hyper-block when a new common block is stored on the block chains 110, 120, 130, and 140 connected with the hyper-chain 100. Besides, a creation point of the hyper-block is variously modifiable.

In an embodiment of the present invention, at least one blockchain 110, 120, 130, and 140 may be embodied in a public type or a private type, or mixed thereof. A private blockchain should prevent an external access, so that it is difficult to link a private blockchain with a public blockchain. However, the hyper-chain according to an embodiment of the present invention is capable of linking the private blockchain with the public blockchain. For example, the hyper-chain 100 represents a relation between the private blockchain and the public blockchain, it is possible to identify that any block of the public blockchain is related with that of the private blockchain through the hyper-chain 100. In directly identifying data on the private blockchain, it is possible to make the data of a corresponding private blockchain to be read after checking an authority with respect to the private blockchain for security.

Figure 2:
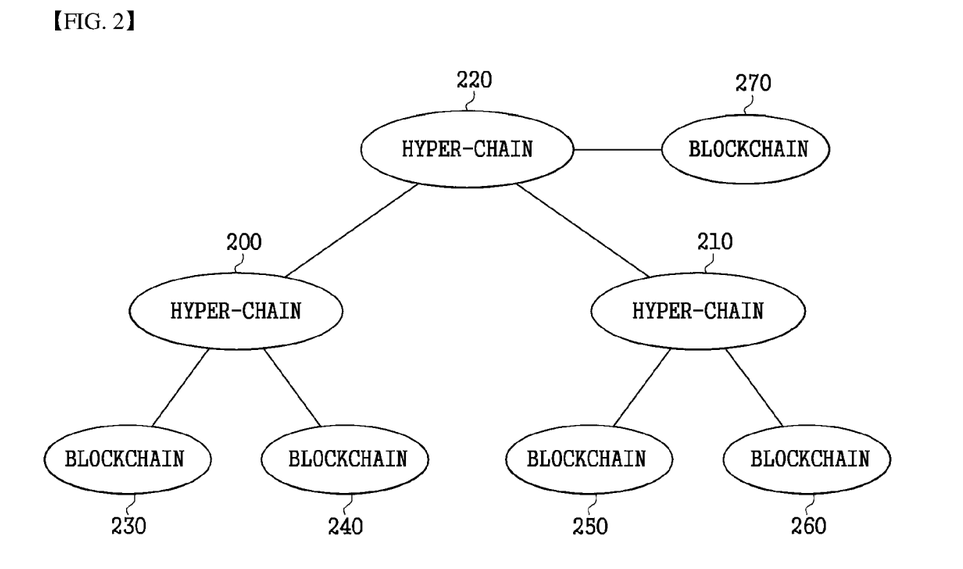
FIG. 2 shows an enlarged concept of a hyper-chain according to an embodiment of the present invention.

FIG. 2 shows an enlarged concept of a hyper-chain according to an embodiment of the present invention.

Referring to FIG. 2, hyper-chains 200 and 210 stores a relation information between common blocks of at least one blockchain 230, 240, 250, and 260. In addition, the hyper-chain 220 stores a relation information between hyper-blocks of the at least one hyper-chain 200 and 210. Furthermore, the hyper-chain 220 stores a relation information between the hyper-block of the at least one hyper-chain 200 and 210 and the common block of at least one blockchain 270.

For example, if there exist that a first hyper-chain 200 storing a relation information between a first blockchain 230 storing a CCTV image and a second blockchain 240 storing a product payment information of users, and a second hyper-chain 210 storing a relation information between a third blockchain 250 storing a product manufacturing information and a fourth blockchain 260 storing a product purchase information, a third hyper-chain 220 identifying a relation information between the product payment information and the product purchase information to store a relation information between the hyper-blocks of the first and second hyper-chains 200 and 210 can be created. In this case, if a specific user purchases a product and pays it, it is possible to easily identify a CCTV image, a purchased product information, and a product manufacturing information of the user through the first to third hyper-chains at once.

Figure 3:
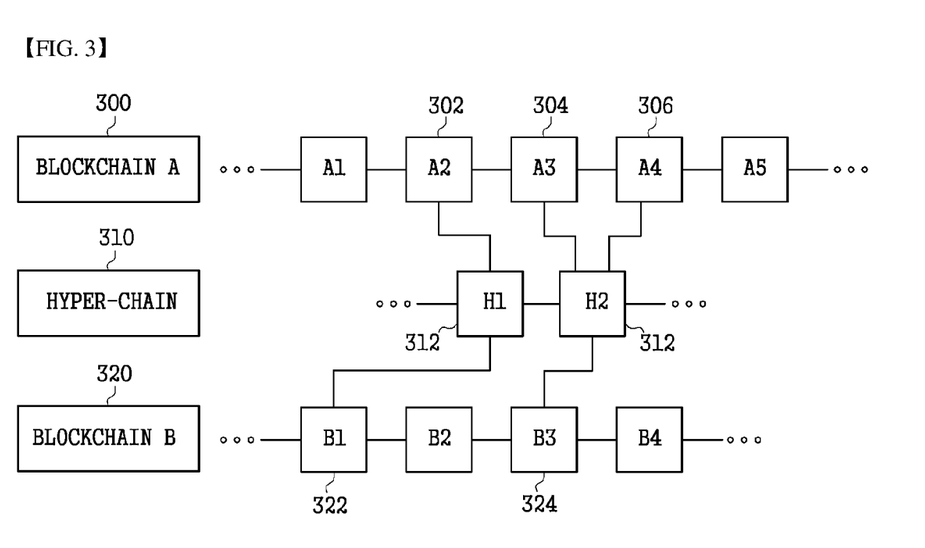
FIG. 3 shows an example of a method for linking a plurality of blockchains through a hyper-chain according to an embodiment of the present invention.

FIG. 3 shows an example of a method for linking a plurality of blockchains through a hyper-chain according to an embodiment of the present invention.

Referring to FIG. 3, a blockchain linking apparatus identifies a correlation between a common block of a blockchain A 300 and a common block of a blockchain B 320. In case that the blockchain A 300 stores a product manufacturing information, and the blockchain B 320 stores a product purchase information, the blockchain linking apparatus respectively identifies through an identification information a product the common blocks of the blockchains A and B 300 and 320 in which an information with respect to the same product is stored. For example, if it is identified that there exists a correlation between a common block A2 302 of the blockchain A 300 and a common block B1 322 of the blockchain B 320, a relation information with respect to the common blocks A1 and B1 302 and 322 are stored on a hyper-block H1 312 of the hyper-chain 310.

The number of related common blocks may be various. For instance, common blocks A3 and A4 304 and 306 of the blockchain A 300 may be related with a common block B3 324 of the blockchain B 320 each other. In this case, a relation information with respect to the common blocks A3 and A4 304 and 306, and the common block B3 324 are stored on a hyper-block H1 312 of the hyper-chain 310.

In another embodiment of the present invention, a correlation may exist only between a plurality of common blocks located on any one blockchain. For example, if a correlation exists only between the common blocks A3 and A4 304 and 306 of the blockchain A 300, and a correlation with respect to the common block B3 324 does not exist, only relation information with respect to the common blocks A3 and A4 304 and 306 is stored in the hyper-block H2 312 of the hyper-chain 310.

The correlation between the plurality of the common blocks may be identified by various predetermined methods. For example, if an information stored on each of the blockchains 300 and 320 is with respect to a product, it is possible to identify a related common block based on a product identification information. As another example, if an information stored on two blockchains is a CCTV image and a sensing information such as a product purchase information capable of recognizing user behaviors, the correlation between the common blocks can be identified based on time and space information.

In the present embodiment, only two blockchains 300 and 320 are shown for understanding, but three or more blockchains may exist depending on embodiments. In addition, when only one blockchain 300 exists, the hyper-chain 310 identifies a plurality of common blocks related within one blockchain 300, and then stores a relation information of these blocks.

FIG. 4 shows an example of a blockchain according to an embodiment of the present invention.

Referring to FIG. 4, common blocks 400 and 450 of the blockchain includes a block header 420 and a block data 430. The block header 420 includes a previous block address 422, a time stamp 424, a nonce 426, and a hash value 428 of a block data 430. The previous block address 422 may be comprised of a hash value of a block header of a previous common block. The construction of the time stamp 424, the nonce 426, and the hash value of the block data 428 are well known to those skilled in the art and thus their detailed description will be omitted herein for a concise explanation and in order to avoid unnecessarily obscuring the present invention. It will be understood that the common blocks 400 and 450 according to an embodiment of the present invention are illustrative and that the scope of the invention is not limited to them. Many variations, modifications, additions and improvements of the construction of the block header 420 and a kind of data included in the block data 430 are possible according to embodiments. In addition, the common blocks 400 and 450 further includes other data as well as the block header 420 and the block data 430.

FIG. 5 shows an example of a hyper-chain according to an embodiment of the present invention.

Referring to FIG. 5, hyper-blocks 312 and 314 of the hyper-chain includes a block header 500, a block list 520, and a block data 530. The present embodiment of the present invention will be described based on the hyper-blocks H1 and H2 312 and 314 shown in FIG. 3 for understanding.

The block header 500 includes a hyper-block identification information 502, a hash data 504, a time stamp 506, a nonce 508, and a hash value of a block data 530. The hyper-block identification information 502 is an information uniquely assigned to each of the hyper-blocks 312 and 314 for identification.

The hash data 504 includes a hash value with respect to the block header of at least two common blocks 302 and 322 and the block header of the previous hyper-block. For example, the hyper-block H1 312 stores a relation information between the common block A2 302 of the blockchain A 300 and the common block B1 322 of the blockchain B 320 as shown in FIG. 3, and the hash data 504 of the block header 500 includes a hash value with respect to the block header of the common block A2 302, the block header of the common block B1 322, and the block header of the previous hyper-block. In addition, the hash data 540 of the hyper-block H2 314 includes a hash value with respect to the block header of the common blocks A2 and A3 304 and 306, the block header of the common block B3 324, and the block header 500 of the hyper-block H1 312. As like this, the hash data 504 included in the block header 500 of the hyper-blocks 312 and 314, unlike the previous block address 422 of the common block of FIG. 4, is constructed to refer all of the block header of related common blocks 302 and 322 as well as a block header of a previous hyper-block.

The block list 520 includes a list of at least two related common blocks. If the common block includes a block identification information, the block list 520 may be constructed with a block identification information of the related common block. Besides, the block list 520 may be constructed with various information (e.g., a hash value of a block header) capable of a common block. For example, the block list 520 of the hyper-block H1 312 includes a list information representing the common block A2 302 and common block B1 322, and a block list 520 of the hyper-block H2 314 includes a list information representing the common blocks A2, A4, and B3 304, 306, and 324.

The block data 530 may include data for explaining an attribute or a relation between the at least two correlated common blocks 302 and 322. For instance, the block data 530 may include semantic data for explaining a relation between correlated common blocks or ontology and may be stored in XML (eXtensible Markup Language). In addition, data content included in the block data can be variously modified according to embodiments.

Figure 6:
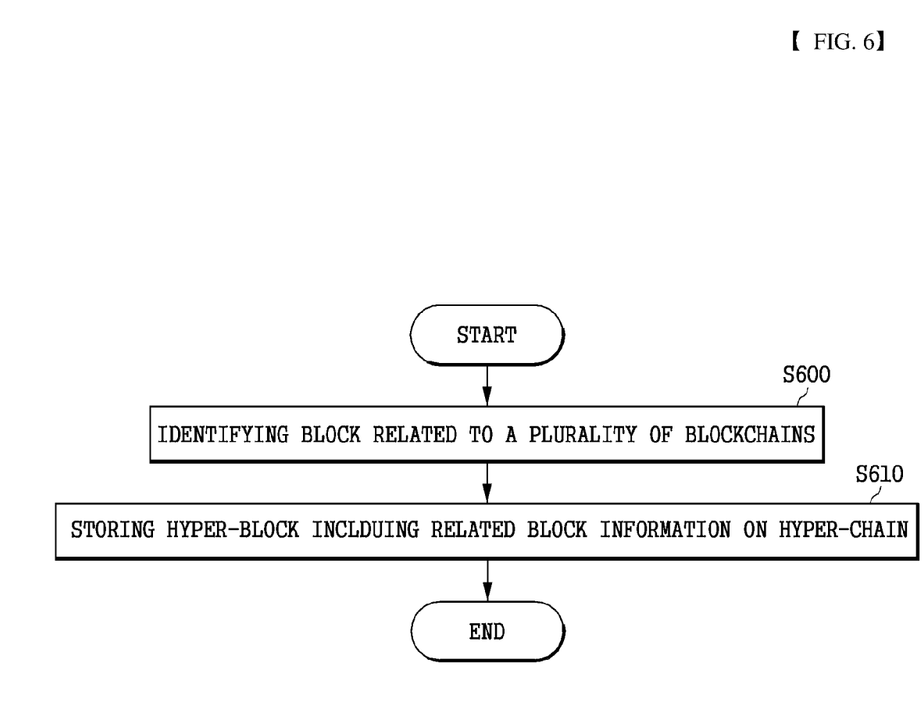
FIG. 6 is a flowchart illustrating an example of a method for linking a blockchain according to an embodiment of the present invention.

FIG. 6 is a flowchart illustrating an example of a method for linking a blockchain according to an embodiment of the present invention.

Referring to FIG. 6, the blockchain linking apparatus identifies a correlation between at least two common blocks of at least one blockchain by a predetermined method (S600). For example, it is identified that the common block A2 302 of the blockchain A 300 is related with the common block B1 322 of the blockchain B 310 each other.

The blockchain linking apparatus stores a hyper-block including a relation information of the common block (S610). For instance, if the common block A2 302 is related the common block B1 322 each other, the blockchain linking apparatus generates a hash value with respect to the block header of two common blocks and a block header of a previous hyper-block, and a hyper-block including a list with respect to two common blocks as shown in FIG. 5, and then can store them on a hyper-chain.

Figure 7:
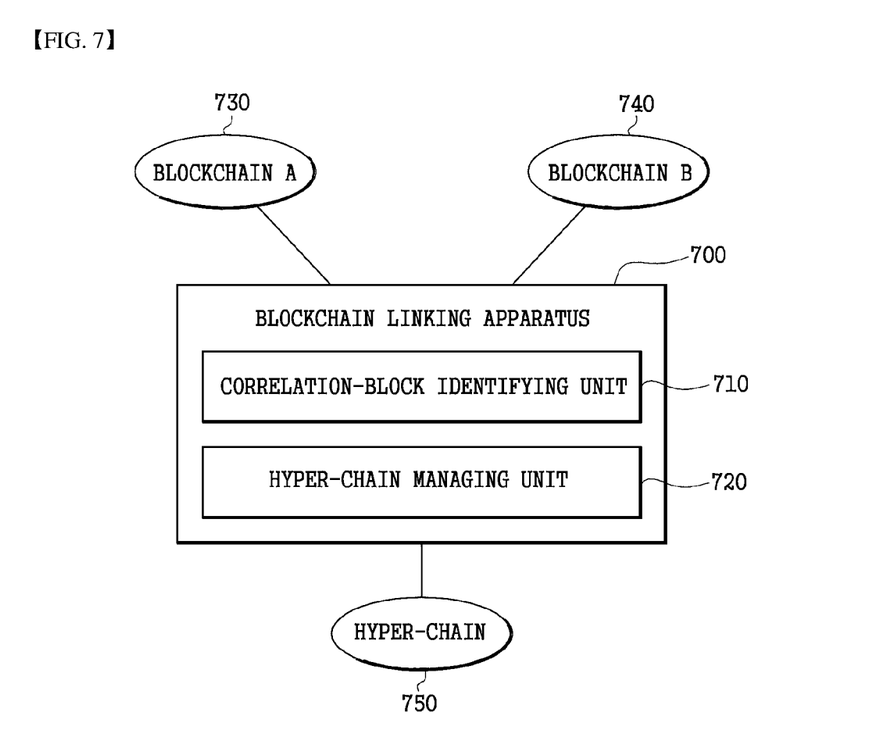
FIG. 7 shows an example of a block-chain linking apparatus according to an embodiment of the present invention.

FIG. 7 shows an example of a block-chain linking apparatus according to an embodiment of the present invention.

Referring to FIG. 7, a blockchain linking apparatus 700 is linked to at least one blockchain 730 and 740, and a hyper-chain 750. The blockchain linking apparatus 700 is one of multiple servers composed the hyper-chain 750 or the blockchains 730 and 740, or a server connected to the one of the multiple servers.

The blockchain linking apparatus 700 includes a correlation-block identifying unit 710 and a hyper-chain managing unit 720. The correlation-block identifying unit 710 identifies at least two correlated common blocks on the at least one blockchain 730 and 740. The correlation can be identified by a predetermined method.

The hyper-chain managing unit 720 creates a hyper-block including a relation information of the at least two correlated common blocks and stores it on the hyper-chain 750. An example of the hyper-chain 750 is shown in FIG. 5.

It is possible that the present invention is embodied as a computer-readable code on a computer-readable recording medium. The computer-readable recording medium includes all kinds of recording devices in which computer-readable data is stored. Examples of computer-readable recording media are ROM, RAM, CD-ROM, Magnetic Tape, Floppy Disk, Optical Data Device, and so forth. In addition, computer-readable recording media are distributed to a computer system connected by networks, a computer-readable code is stored and performed in a distributed method.

According to an embodiment of the present invention, the correlation of information stored on a plurality of blockchains can be stored and managed without forgery dangers using a hyper-chain.

All such changes, modifications, variations and other uses and applications which do not depart from the spirit and scope of the invention are deemed to be covered by the invention which is limited only by the claims which follow.

What is claimed is:

1. A method for linking a blockchain comprising:
    identifying a correlation of a common block of a first blockchain and a common block of a second blockchain by a predetermined method on at least two blockchains including the first blockchain and the second blockchain to determine at least two correlated common blocks that are correlated with each other and are included in the at least two blockchains, respectively; and
    storing a hyper-block including an information of the at least two correlated common blocks on the at least two blockchains on a hyper-chain.

2. The method of claim 1, wherein the first blockchain and the second blockchain include a public blockchain or a private blockchain.

3. The method of claim 1, wherein storing the hyper-block comprises:
    calculating a hash value with respect to block headers of the at least two correlated common blocks and a block header of a previous hyper-block of the hyper-chain;
    generating a hyper-block including the hash value and a block list including an information with respect to the at least two correlated common blocks; and
    storing the hyper-block on the hyper-chain.

4. The method of claim 2, wherein the hyper-block includes a data representing an attribute or a relation of the at least two correlated common blocks.

5. An apparatus for linking a blockchain comprising:
    a correlation-block identifying unit for identifying a correlation of a common block of a first blockchain and a common block of a second blockchain by a predetermined method on at least two blockchains including the first blockchain and the second blockchain to determine at least two correlated common blocks that are correlated with each other and are included in the at least two blockchains, respectively; and
    a hyper-chain managing unit for storing a hyper-block including an information of the at least two correlated common blocks on a hyper-chain.

6. The apparatus of claim 5, wherein the hyper-chain managing unit calculates a hash value with respect to block headers of the at least two correlated common blocks and a block header of a previous hyper-block of the hyper-chain and generates a hyper-block including the hash value and a block list including an information with respect to the at least two correlated common blocks.

7. The apparatus of claim 6, wherein the hyper-block further includes a data representing an attribute or a relation of the at least two correlated common blocks.

8. A storage medium for storing a hyper-block comprising:
    a block header of the hyper-block including a hash value that is calculated with respect to block headers of at least two correlated common blocks that are correlated with each other and are included in the at least two blockchains, respectively and a block header of a previous hyper-block;
    a block list including a list of the at least two correlated common blocks; and
    a block data including a data representing an attribute or a relation of the at least two correlated common blocks.

9. A non-transitory computer-readable recording medium having stored thereon a program for performing the method for linking a blockchain in claim 1.

10. The method of claim 1, wherein the hyper-block further includes a block header and a block list,
    wherein the block header of the hyper-block includes a hash value calculated with respect to block headers of the at least two correlated common blocks and a block header of a previous hyper-block on the hyper-chain, and
    wherein the block list of the hyper-block includes a list of the at least two correlated common blocks.

11. The apparatus of claim 5, wherein the hyper-block further includes a block header and a block list,
    wherein the block header of the hyper-block includes a hash value calculated with respect to block headers of the at least two correlated common blocks and a block header of a previous hyper-block on the hyper-chain, and
    wherein the block list of the hyper-block includes a list of the at least two correlated common blocks.

* * * * *